United States Patent [19]
Gunyou et al.

[11] 3,772,861
[45] Nov. 20, 1973

[54] CORN HARVESTER WITH IMPROVED EAR DISTRIBUTION
[75] Inventors: Lyman J. Gunyou; David W. List, both of Celina, Ohio
[73] Assignee: Avco Corporation, Coldwater, Ohio
[22] Filed: Mar. 2, 1972
[21] Appl. No.: 231,264

[52] U.S. Cl............ 56/14.2, 56/2, 56/16.5, 130/5 G
[51] Int. Cl............................................ A01d 45/02
[58] Field of Search............... 56/2, 14.1, 14.2, 56/16.4, 16.5, 17.2; 130/5 E, 5 F, 5 G, 33

[56] References Cited
UNITED STATES PATENTS

| 3,320,730 | 5/1967 | Barkstrom et al. | 56/2 X |
| 1,849,484 | 3/1932 | Frisell et al. | 130/33 |
| 2,882,063 | 4/1959 | Strasel | 56/17.2 X |
| 3,113,574 | 12/1963 | Greedy et al. | 130/33 X |
| 3,425,194 | 2/1969 | Scott et al. | 56/2 X |
| 3,366,120 | 1/1968 | Gunyou | 130/5 G |

Primary Examiner—Louis G. Mancene
Assistant Examiner—J. N. Eskovitz
Attorney—Charles M. Hogan et al.

[57] ABSTRACT

A three-row field-going corn harvester where the corn snapped from adjacent rows is distributed to a husking bed having three groups of husking rolls through separate paths, thereby improving distribution of the corn. A sheller may be positioned in place of the husker and the three flow channels are easily converted into a single discharge into the sheller.

16 Claims, 4 Drawing Figures

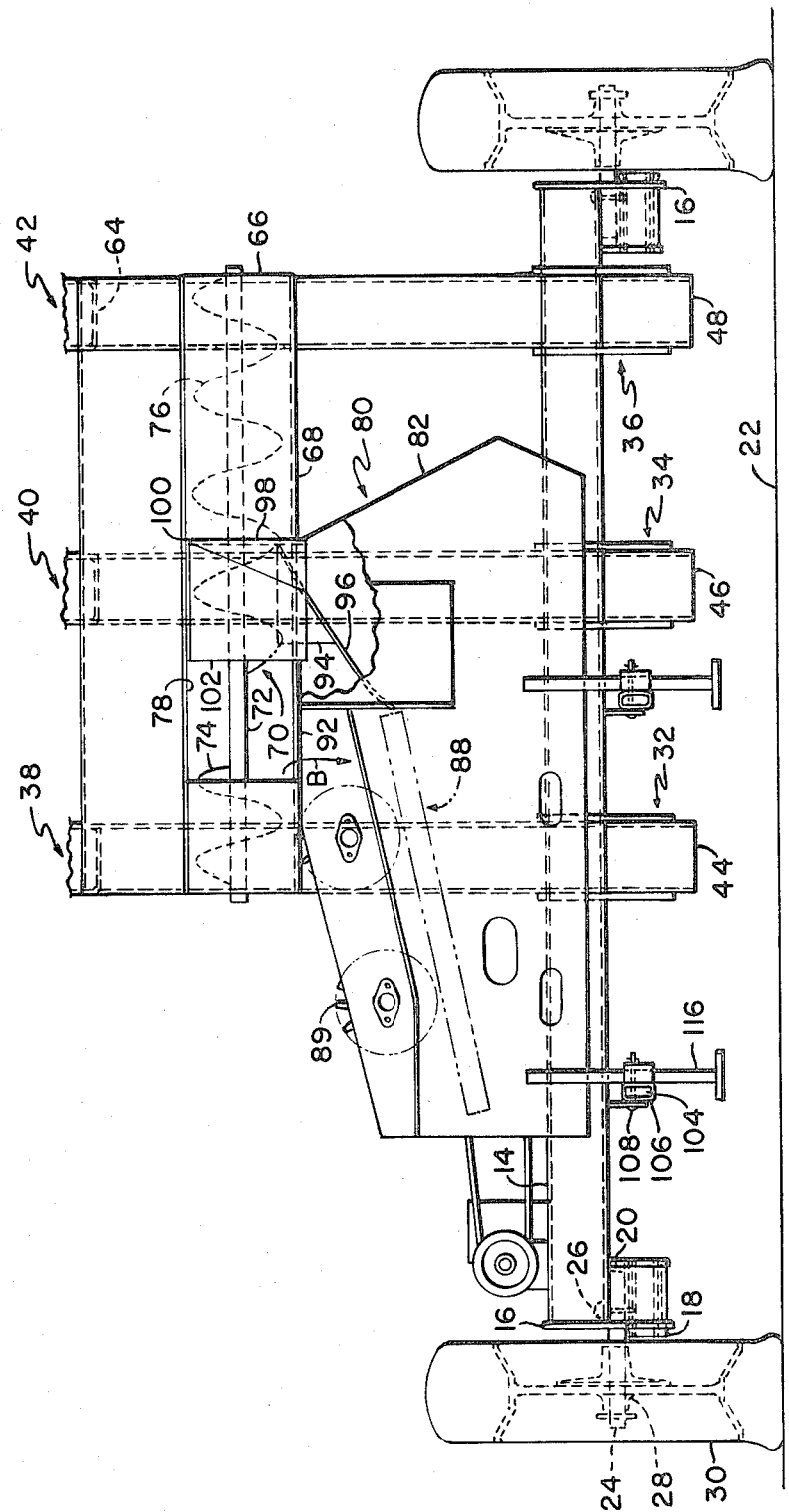

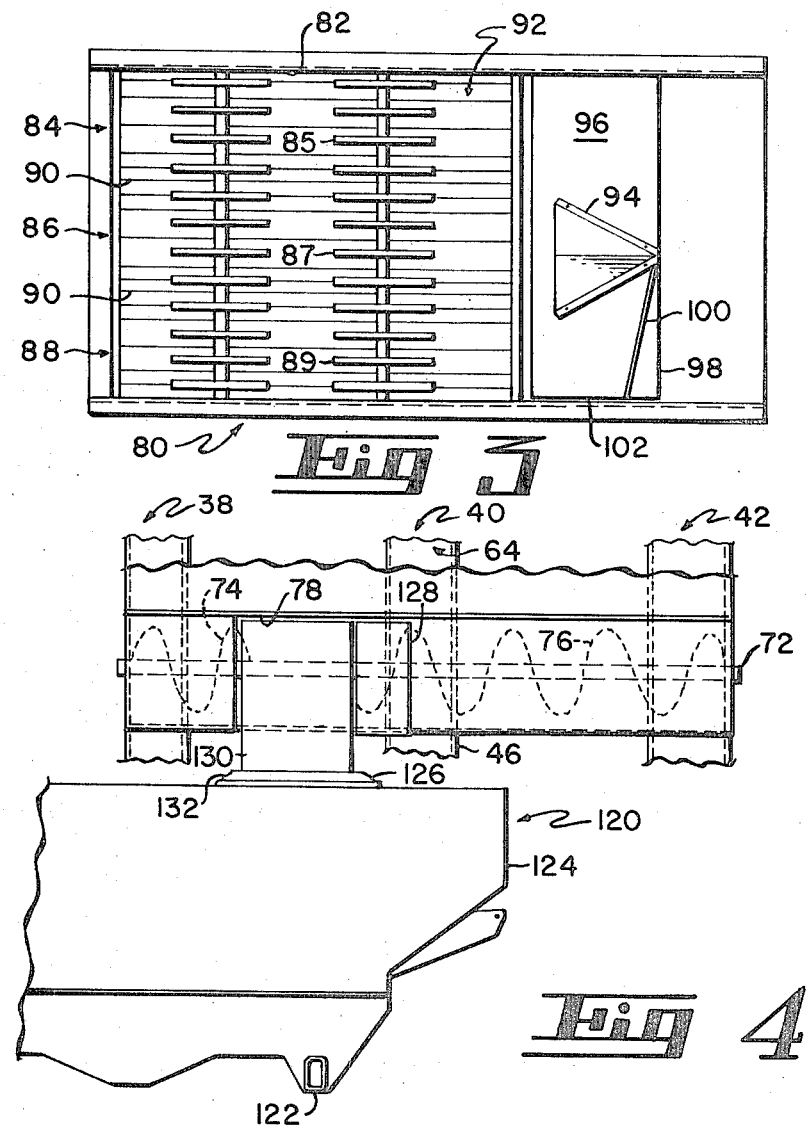

CORN HARVESTER WITH IMPROVED EAR DISTRIBUTION

The present invention relates to corn harvesting units and more specifically to distribution of ears of corn in such a unit.

It has been a common problem of corn harvesting units to properly distribute ears of corn to the various processing units under widely varying field conditions.

It is an object of the present invention to properly distribute ears of corn in a field-going corn harvesting unit.

These ends are achieved by a field-going corn harvesting unit which has a plurality of fore and aft extending gathering devices and conveyors associated with each gathering device for discharging the ears at an elevated position. A generally laterally extending housing receives the discharge from the conveyors and has a discharge opening between adjacent conveyors. An auger rotatably journaled in the housing at a right angle to the conveyors has first and second reverse flights propelling ears of corn from both ends toward the discharge opening. A processing unit receives ears of corn from the discharge opening and a means adjacent the discharge opening uniformly distributes ears of corn to the processing unit.

The above and other related objects and features of the present invention will be apparent from a reading of the description of the disclosure shown in the accompanying drawing and the novelty thereof pointed out in the appended claims.

In the drawing:

FIG. 2 is a rear elevational view of the corn harvesting unit of FIG. 1;

FIG. 3 is a fragmentary view of the corn harvesting unit of FIG. 1, taken on line 3—3 of FIG. 1; and FIG. 4 is a fragmentary rear view of a field-going corn harvesting unit similar to the one in FIG. 1, showing a corn shelling processing unit in place of the corn husking unit.

Figure 1:
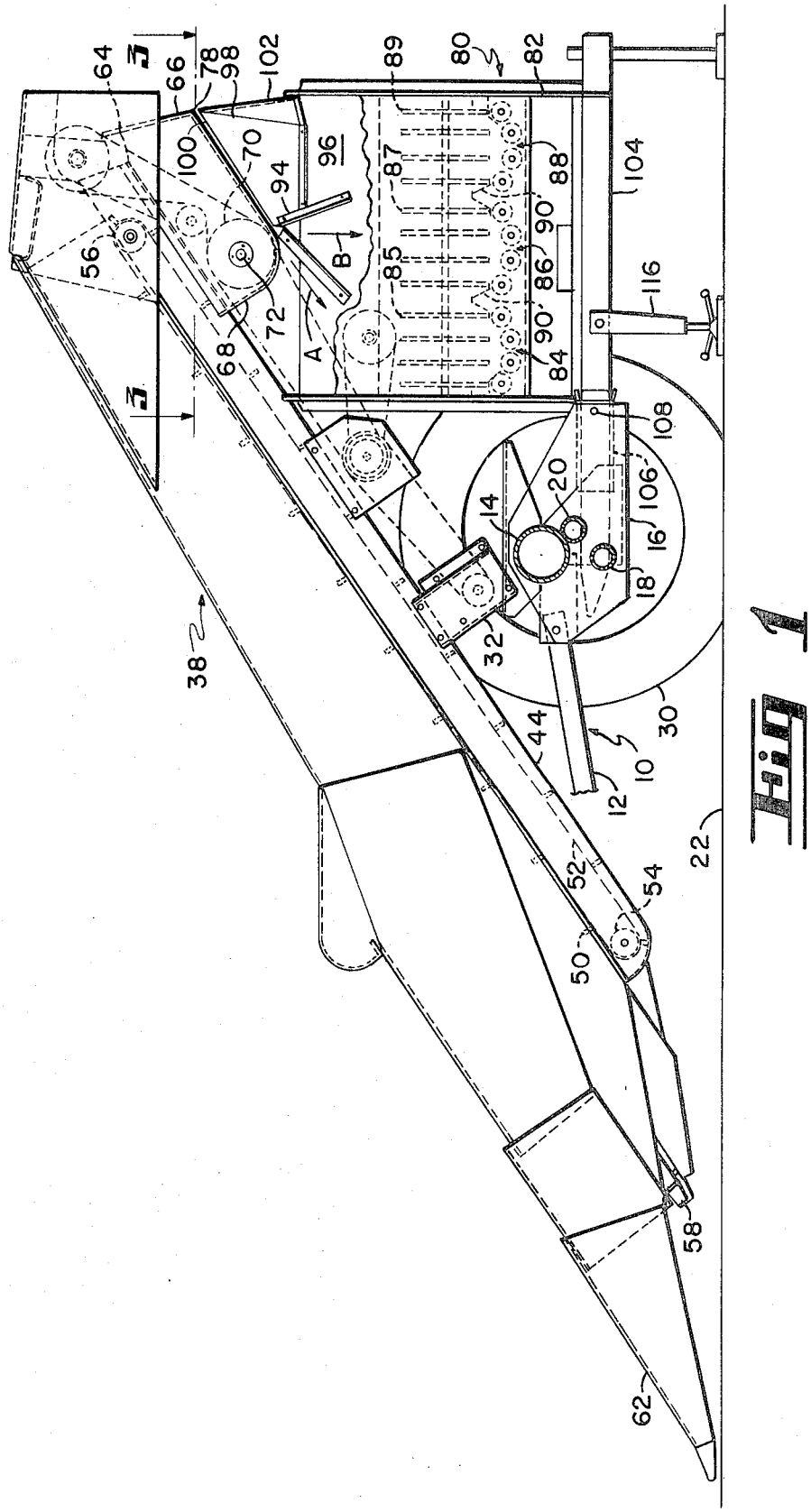
FIG. 1 is a side elevational view of a field-going corn harvesting unit embodying the present invention, including a corn husking unit.

Referring particularly to FIG. 1, there is shown a field-going corn harvesting unit comprising a generally L-shaped frame 10 comprising a draft linkage 12 (only a portion of which is shown) and a generally tubular cross member 14. Plates 16 at opposite ends of tube 14 have tubes 18 and 20 secured to them at different heights relative to a ground reference plane 22. An axle shaft 24 is telescoped into one of the tubular elements 20 or 18 (herein shown as tube 20) and is held in there by a suitable locking pin 26 extending through appropriate holes in the tube and the axle shaft 24. Axle 24 has a bearing assembly 28 which journals a pair of ground support wheels 30.

A series of box support assemblies 32, 34 and 36 are welded onto transverse tube 14 at spaced locations. The assemblies provide mounting points for a series of fore and aft gathering and conveying units, generally indicated by reference characters 38, 40 and 42, respectively. The gathering and conveying units 38, 40 and 42 have conveyor housings 44, 46 and 48, respectively, secured to plates 32, 34 and 36, respectively.

The internal mechanism in each of the gathering and conveying units will be discussed with reference to unit 38 only to simplify the description. The internal mechanism in units 40 and 42 is identical to that in 38.

Snapper rolls 58, positioned at the forward end of the unit 38, are driven by a suitable drive train (not shown to simplify the description of the invention). The rolls rotate so that they grab a stalk which enters the low end of the rolls in between shoes 62 on opposite sides of each set of rolls. The shoes 62 act as a guide to direct the stalk into the bite of the rolls 58. The rolls may take many forms to effectively snap off ears of corn without clogging. One example of a configuration suitable for this purpose may be found in U.S. Pat. No. 3,075,340, entitled "Corn Harvester", in the name of R. R. Raney et al, issued on Jan. 29, 1963 and of common assignment with the present invention.

Within housing 44 a conveyor is mounted. The conveyor comprises a series of paddles 50 connected to a chain assembly 52 trained around drive sprockets 54 and 56. At its lower forward end the conveyor receives ears of corn that have been removed from the stalk by the snapper rolls 58 and elevates them to its aft end.

Each of the conveyor housings 44, 46 and 48 have an elevated discharge 64 into a laterally extending housing 66 connected to the conveyor housings 44, 46 and 48. Housing 66 has a bottom wall portion 68 having a lower shape which conforms to an auger assembly 70, generally at right angles to the longitudinal axis of the conveyors. Auger assembly 70 has a central shaft 72 journaled in housing 66 and driven through a suitable gearing arrangement (not shown). Auger flights 74 and 76 are mounted on shaft 72 and are reversed so that for a given rotation of shaft 72 auger flights 74 and 76 propel corn from the end conveyors toward the center of the harvesting unit. As shown particularly in FIG. 2, there is a discharge opening 78 in between adjacent conveyor housings 44 and 46. A processing unit, such as the husking unit 80 shown in FIGS. 1, 2 and 3, is positioned beneath discharge opening 78 to receive the ends of corn for husking purposes. To simplify the description of the invention the details of the husking unit have been omitted. However, reference may be had to U. S. Pat. No. 3,450,138 entitled "Material Separating Mechanism for a Husking Unit" which illustrates a husking unit particularly suited for use with the present invention. As shown in FIGS. 1, 2 and 3, the husking unit 80 comprises a housing 82 in which sets of husking rolls 84, 86 and 88 are journaled. Flexible wheel assemblies 85, 87 and 89, respectively, propel the ears of corn along the rolls from right to left, as viewed in FIG. 2, while the rolls rotate in such a fashion that they pull the husks off. Suitable trash removal mechanisms (not shown) are provided so that only husked corn leaves the discharge of the unit. V-plates 90 between the husking roll sets guide ears of corn into the bite of the sets of husking rolls.

The husking unit 80 has an inlet region 92 where unhusked ears of corn are directed. This region generally is aligned with the discharge opening 78 of the housing 66. To insure uniform distribution of corn between the conveyors and the husking rolls, a generally triangular deflector 94 is mounted on a platform 96 on housing 82. Deflector 94 is generally in line with roll sets 86 and positioned so that corn discharged from auger flight 76 is deflected onto husking roll set 84, as shown by arrow A. Since the axis of auger 70 is generally in line with the husking roll set 86, the corn discharged from auger flight 74 drops directly onto husking roll set 86, as shown by arrow B. As noted particularly in FIGS. 1 and 2, discharge opening 78 has a sufficient vertical height so that ears of corn from conveyor housing 46 drop directly downward through the opening. These ears of corn are directed onto the husking roll set 88 by a sheet metal deflector comprising an end wall 98 extending generally normal to the triangular deflector 94 and having an upper edge 100 closely adjacent the one end of discharge opening 78. A back wall 102 integral with end wall 98 generally opposes the triangular deflector 94 to act effectively as a chute for ears of corn discharged from conveyor housing 46.

The husking unit 80 is removably detachable from the tubular frame 14 in a fore and aft direction. This is accomplished by a pair of fore and aft extending spaced parallel forks 104 which are received in support sockets 106 secured to tubular element 14 and held therein by pins 108 extending through suitable registering holes in sockets 106 and forks 104. Although not shown, an additional frame member may be incorporated to support the aft end of the husking unit 80. Suitable jack assemblies 116 on the forks 104 enable the vertical height of the husking unit 80 to be varied so that the frame may be backed against the processing unit with forks 104 registering with the sockets 106.

As describd above, a corn husking unit 80 was used in conjunction with the gathering and conveying unit. As shown particularly in FIG. 4, a corn shelling unit 120 is used in its place. The corn shelling unit 120 has forks 122 which removably mount in sockets 106 in a fashion similar to that for the husking unit 80. The details of sheller 120 are not described. However, this type of unit typically takes the form of an elongated perforated cylindrical cage in which a rotor comprising an inlet auger and a tooth cylinder are journaled. The auger packs the corn into the toothed portion of the cylinder and the rubbing motion causes kernels of corn to be ejected through the perforated cage. The corn sheller 120 has a housing 124 with an inlet 126. For this type of processing unit a single exit is used. Therefore a plate 128 is secured over discharge opening 78 so that all the corn from chute 46 and auger flights 74 and 76 are directed toward a discharge chute 130 extending downward to opening 126. Suitable flexible strips 132 provide a good seal between chute 130 and opening 126.

The above corn harvesting unit enables a highly effective and flexible application in harvesting corn. The deflectors and the corn husking unit insure that there are three discrete paths for corn, thereby permitting each path to efficiently handle a maximum flow of corn without clogging. The same unit can be quickly and economically converted to use with a corn shelling unit for different farm purposes.

While preferred embodiments of the present invention have been described, it should be apparent to those skilled in the art that it may be modified by those skilled in the art without departing from the spirit and scope of the present invention.

Having thus described the invention what is claimed as novel and desired to be secured by Letters Patent of the United States is:

1. A field-going corn harvesting unit comprising:
   a plurality of fore and aft extending gathering devices for removing ears of corn from adjacent rows of corn;
   an elongated fore and aft extending conveyor for each gathering device receiving said ears of corn and discharging them at an elevated position;
   a laterally extending housing connected to the discharge of said conveyors, said housing, gathering devices and conveyors forming a single assembly, said housing having a single discharge opening between adjacent conveyors;
   an auger rotatably journaled in said housing generally at a right angle to said conveyors, said auger having first and second flights shaped to propel ears of corn from both ends toward said discharge opening;
   a processing unit removably secured to said assembly and receiving ears of corn from said discharge opening; and
   at least one deflector element adjacent said discharge opening for uniformly distributing ears of corn to said processing unit.

2. A field-going corn harvesting unit as in claim 1 further comprising:
   a frame for mounting said gathering devices, conveyors, housing and processing unit;
   rotatable wheels for ground support; and
   means for selectively journaling said wheels to said frame at first and second heights, whereby the position of the gathering unit relative to the ground is adjustable.

3. A field-going corn harvesting unit as in claim 2 wherein said selective journaling means comprises:
   first and second laterally extending tubular elements secured to said frame at different vertical locations;
   a wheel axle telescoped into one of said tubular elements; and
   a releasably engageable holding pin for retaining said wheel axle in one of said tubular supports.

4. A field-going corn harvesting unit as in claim 1 wherein:
   said processing unit comprises a sheller for removing kernels from said ears of corn;
   said deflector element comprises a sheet metal housing conforming to the bottom of said upper auger housing and having a single downwardly directed chute for providing a single discharge for ears into said corn sheller; and
   resilient sealing elements provided around the opening into said sheller for yieldingly sealing said chute to said corn sheller.

5. A field-going corn harvesting unit as in claim 4 further comprising:
   a frame for mounting said gathering devices, conveyors, housing and processing unit;
   ground support rotatable wheels; and
   means for selectively journaling said wheels to said frame at first and second heights, whereby the position of the gathering unit relative to the ground is adjustable.

6. A field-going corn harvesting unit as in Claim 5 wherein:
   first and second laterally extending tubular elements secured to said frame at different vertical locations;
   a wheel axle telescoped into one of said tubular elements; and
   a releasably engageable holding pin for retaining said wheel axle in one of said tubular supports.

7. A field-going corn harvesting unit as in Claim 1 wherein:
   said processing unit comprises a husking unit having at least a pair of sets of husking rolls journaled parallel to the axis of rotation of said auger, one of said sets of rolls being positioned directly underneath the axis of said auger whereby ears from said first auger flight drop directly onto said roll;

said deflector element comprises a wall mounted underneath the discharge from said second auger flight for diverting ears to the adjacent sets of rolls.

8. A field-going corn harvesting unit as in claim 7 wherein there are three corn gathering units and conveyors and three sets of husking rolls and wherein:

said auger is adapted to transfer ears of corn from the end conveyors toward said discharge opening positioned between the middle conveyor and the conveyor discharging corn to said first auger flight;

said middle conveyor is adapted to discharge corn directly onto said third set of husking rolls;

said discharge opening has a sufficient opening to permit corn to drop directly onto said third set of husking rolls;

said deflector element further comprises a wall for directing ears of corn onto said third set of husking rolls.

9. A field-going corn harvesting unit as in claim 8 wherein:

said walls comprise a first triangularly shaped wall forming on one side of a deflector for said corn entering from said second auger flight and on the other side a deflector for corn coming from said middle conveyor; and said wall for said third husking bed comprises a generally L-shaped wall having a first portion extending normal to and from the one side of said triangular duct and a second portion generally opposed to said triangularly shaped deflector.

10. A field-going corn harvesting unit as in claim 1 further comprising:

a frame mounting said gathering devices, said conveyors and said housing; and means for detachably mounting said processing unit to said frame, the processing unit being detachably mounted to said frame in a fore and aft direction.

11. A field-going corn harvesting unit as in claim 10 wherein said detachable mounting means comprises:

a pair of generally rectangular spaced support sockets on said frame;

a pair of horizontally extending spaced forks supporting said processing unit and adapted to be telescoped into said support sockets on said frame; and pins for detachably holding said forks in said sockets.

12. A field-going corn harvesting unit as in Claim 10 wherein:

said processing unit comprises a husking unit having at least a pair of sets of husking rolls journaled parallel to the axis of rotation of said auger, one set of said rolls being positioned underneath the axis of said auger whereby ears from said first auger flight drop directly onto said roll;

said deflecting element comprises a wall mounted underneath the discharge from said second auger flight for diverting ears to the adjacent roll.

13. A field-going corn harvesting unit as in Claim 12 wherein there are three corn gathering units and conveyors and three sets of husking rolls and wherein:

said auger is adapted to transfer ears of corn from the end conveyors toward said discharge opening positioned between the middle conveyor and the conveyor discharging corn to said first auger flight;

said middle conveyor is adapted to discharge corn directly onto said third set of husking rolls;

said discharge opening has a sufficient opening to permit corn to drop directly onto said set of husking rolls; and said deflecting element further comprises a wall for directing ears of corn onto said third set of husking rolls.

14. A field-going corn harvesting unit as in Claim 13 wherein:

said walls comprise a first triangularly shaped wall forming on one side a deflector for said corn entering from said second auger flight and on the other side a deflector for corn coming from said middle conveyor; and said wall for said third husking bed comprises an L-shaped sheet having a first portion extending normal to and from the one side of said triangular duct and a second portion generally opposed to said triangularly shaped deflector 15. A field-going corn harvesting unit as in Claim 14 further comprising:

a pair of ground support wheels; and means for detachably mounting said wheels to said frame at differing heights.

16. A field-going corn harvesting unit as in Claim 15 wherein:

first and second laterally extending tubular elements secured to said frame at different vertical locations;

a wheel axle telescoped into one of said tubular elements; and a releasably engageable holding pin for retaining said wheel axle in one of said tubular supports.

* * * * *